(12) United States Patent
Wegeng et al.

(10) Patent No.: US 8,012,062 B2
(45) Date of Patent: Sep. 6, 2011

(54) APPARATUS AND METHOD OF ENGINE TORQUE CONTROL DURING POWER TAKE-OFF OPERATION IN A MOTOR VEHICLE

(75) Inventors: William J. Wegeng, Avon, IN (US); John D. Hylton, Plainfield, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 1030 days.

(21) Appl. No.: 11/852,630

(22) Filed: Sep. 10, 2007

(65) Prior Publication Data

US 2009/0069154 A1    Mar. 12, 2009

(51) Int. Cl.
*B60W 10/04* (2006.01)
(52) U.S. Cl. .................... 477/107; 477/111
(58) Field of Classification Search .............. 477/113, 477/111
See application file for complete search history.

(56) References Cited

U.S. PATENT DOCUMENTS

| | | | |
|---|---|---|---|
| 5,522,778 A * | 6/1996 | Iwase et al. | 477/62 |
| 6,619,257 B2 * | 9/2003 | Tarasinski | 123/350 |
| 2005/0239598 A1 * | 10/2005 | Bauerle et al. | 477/111 |
| 2005/0288152 A1 * | 12/2005 | Hitch et al. | 477/121 |

\* cited by examiner

*Primary Examiner* — David D Le
*Assistant Examiner* — Erin D Bishop
(74) *Attorney, Agent, or Firm* — Quinn Law Group, PLLC

(57) ABSTRACT

An apparatus and method is provided for controlling torque in a powertrain having an engine and a transmission capable of operating a power take-off unit. The apparatus includes: a controller selectively operable to send a power take-off unit activation request to a transmission control module within the powertrain; a transmission control module capable of receiving the power take-off unit activation request; and wherein the apparatus is configured to prevent the torque of the engine from exceeding a maximum defined torque value when the power take-off unit is in operation. The apparatus includes an engine control module capable of receiving commands from the transmission control module through a data link connecting them.

18 Claims, 2 Drawing Sheets

APPARATUS AND METHOD OF ENGINE TORQUE CONTROL DURING POWER TAKE-OFF OPERATION IN A MOTOR VEHICLE

TECHNICAL FIELD

The present invention relates to an apparatus and method for control of engine torque for a transmission-driven power-take-off (PTO) unit in a motor vehicle, while the vehicle is stationary and the transmission is in neutral.

BACKGROUND OF THE INVENTION

Many motor vehicle transmissions may be configured to accept a power-take-off (PTO) unit as a source of power for operating various accessory devices. In a typical mechanization, the transmission includes a drive gear coupled to the transmission input shaft, and the PTO drive gear is maintained in meshing engagement with an input gear of the PTO unit. The transmission's PTO drive gear has a certain maximum torque capacity. The present invention provides an apparatus and method to ensure that the torque going to the PTO drive gear is within defined limits.

SUMMARY OF THE INVENTION

The present invention provides an apparatus and method for utilizing the transmission control module for engine torque control during the operation of a power take-off (PTO) unit in a motor vehicle to limit the maximum torque which the transmission's PTO drive gear is exposed to. When the vehicle is stationary and operating one or more PTO units with the transmission in neutral, most of the torque being produced by the engine is being used to drive the PTO(s). The vehicle's data link provides the opportunity for the transmission control module to monitor, and when appropriate, limit the engine's torque level. This allows the transmission to limit the engine torque based on the rating of the transmission's internal PTO drive gear.

An apparatus is provided for controlling torque in a powertrain having an engine and a transmission capable of operating a power take-off unit. The apparatus includes: a controller selectively operable to send a power take-off unit activation request to a transmission control module within the powertrain; a transmission control module capable of receiving the power take-off unit activation request; and wherein the apparatus is configured to prevent the torque of the engine from exceeding a maximum defined torque value when the power take-off unit is in operation.

In another aspect of the invention, the apparatus includes an engine control module operably connected to the transmission control module, the engine control module capable of receiving commands from the transmission control module through a data link connecting them. Modern electronically controlled vehicles and engines generally include a variety of electronic equipment such as sensors, electronic fuel control systems, and other systems, which are interconnected by a shared communication path called a data link. The protocols used by such data links have been standardized by the Society of Automotive Engineers (SAE). One such example is the SAE J1939 protocol that provides for serial data communication between microcomputer systems in heavy duty vehicle applications.

In another aspect of the invention, the power take-off unit activation request is sent from the controller to the transmission control module through the data link connecting the transmission control module and the engine control module. Alternatively, the power take-off unit activation request may be sent from the controller to the transmission control module through a discrete wire connecting the controller to the transmission control module.

In another aspect of the invention, the apparatus further includes: a transmission power take-off drive gear in the transmission, the power take-off drive gear being coupled to an input shaft on the transmission; a power take-off input gear engaged with the power take-off drive gear; a power take-off clutch connected to a power take-off output shaft within the power take-off unit, wherein the power take-off unit is activated by operably engaging the transmission power take-off drive gear with the power take-off output shaft.

In yet another aspect of the invention, the apparatus further includes: a power take-off ratio gear connected to the power take-off input gear through a power take-off input shaft; an output gear assembly operably connected to the power take-off ratio gear; and wherein the power take-off clutch selectively engages the output gear assembly to the power take-off output shaft, thereby operably engaging the transmission power take-off drive gear to the power take-off output shaft. In another aspect of the invention, a hydraulic pump is operably connected to the power take-off clutch, to create hydraulic power for equipment attached to the power take-off unit, or to a driveshaft or other means to transmit power.

In another aspect of the invention, the transmission control module broadcasts the maximum defined torque value across the data link connecting the transmission control module and the engine control module, commanding the engine not to exceed the maximum defined torque value. In another aspect of the invention, the maximum defined value is calculated as a function of the gear rating of the power take-off input gear.

In another aspect of the invention the power take-off unit is activated when the PTO enable conditions are met. In another aspect of the invention, the PTO enable conditions are established when all of the following are met: (i) the engine speed is within predetermined limits; (ii) the transmission output speed is within predetermined limits; and (iii) the engine throttle is within predetermined limits.

A method is provided of controlling torque produced by an engine in a powertrain having an engine and a transmission capable of operating a power take-off unit, the method including: sending a power take-off unit activation request to a transmission control module in the powertrain through a selectively operable controller; activating the power take-off; and implementing a program to prevent the engine torque from exceeding a maximum defined value.

The above objects, features and advantages, and other objects, features and advantages of the present invention are readily apparent from the following detailed description of the best mode for carrying out the invention when taken in connection with the accompanying drawings.

DESCRIPTION OF THE PREFERRED EMBODIMENT

Figure 1:
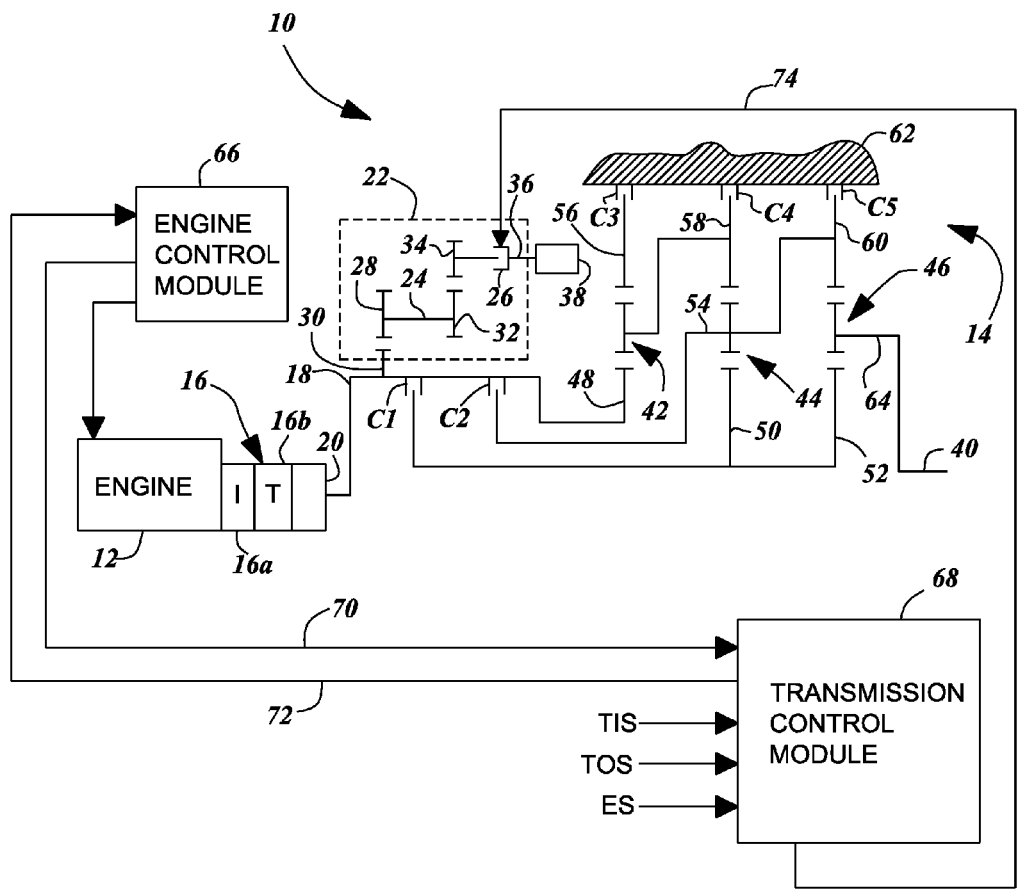
FIG. 1 is a schematic diagram of a motor vehicle powertrain including an engine, transmission control module, engine control module and a PTO unit, for carrying out a power-take-off torque protection (PTOTP) program as described below.

The present invention relates to an apparatus and method for control of engine torque for a transmission-driven powertake-off (PTO) unit in a motor vehicle. FIG. 1 is a diagram of a motor vehicle powertrain 10 for carrying out a power-take-off torque protection (PTOTP) program, as described below, to prevent the torque of the engine from exceeding a maximum defined torque value when the power take-off unit is in operation. The motor vehicle powertrain 10 includes an internal combustion engine 12 and a multi-ratio power transmission 14 having a typical planetary gearset. Alternative suitable types of planetary gearsets may also be used.

The engine 12 is coupled to the transmission 14 through a fluid coupling such as the torque converter 16. An input member or impeller (I) 16a of the torque converter 16 is connected to an output shaft of the engine 12 and an output member or turbine (T) 16b of the torque converter 16 is connected to an input shaft 18 of the transmission 14. While torque is ordinarily transferred through the torque converter 16 with slippage between the impeller 16a and turbine 16b, the powertrain 10 includes a torque converter clutch 20 that is selectively engaged under certain conditions to provide a mechanical coupling between engine 12 and transmission input shaft 18.

In order to use the transmission 14 as a source of power for the vehicle's accessory devices, a PTO unit 22 is attached to the transmission 14, as shown in FIG. 1. The PTO unit 22 includes a PTO input shaft 24, a PTO clutch 26, and a PTO input element such as a PTO input gear 28 which meshes or engages with a power take-off drive element such as a power take-off or PTO drive gear 30 in the transmission 14. The drive and input elements may be gears or any other suitable elements.

The transmission PTO drive gear 30 is continuously coupled to the transmission input shaft 18. The transmission PTO drive gear 30 is in constant mesh with the PTO input gear 28. A PTO ratio gear 32 is connected to the PTO input gear 28, by the PTO input shaft 24. The PTO ratio gear 32 is in constant mesh with a PTO output gear, which is part of a PTO output gear assembly 34. The PTO clutch 26 is used to selectively engage the PTO output gear assembly 34 to the PTO output shaft 36. Thus when the PTO clutch 26 is applied, the transmission PTO drive gear 30 is operably engaged with the PTO output shaft 36. One of the features of the PTO design is their ability to provide a variety of mechanical ratios. This is accomplished by the offering different numbers of gear teeth on the PTO ratio and output gears.

The PTO output shaft 36 may be connected to a hydraulic pump 38 in order to create hydraulic power for the vehicle's auxiliary equipment, or to a driveshaft or other means to transmit power. Alternatively, an electromechanical or electro-hydraulic actuator (not shown) may be used to selectively engage the PTO output shaft 36 with the transmission PTO drive gear 30. Alternatively, some or all of the PTO elements could be located within the transmission 14 instead of in a separate PTO unit 22. Any other suitable arrangement for engaging the elements or gears may also be employed.

The transmission 14 also includes a planetary gear arrangement for selectively coupling the input shaft 18 to a transmission output shaft 40. The planetary gear arrangement includes three inter-connected planetary gearsets 42, 44, 46 and a set of five friction devices or clutches designated as C1, C2, C3, C4 and C5. The input shaft 18 continuously drives a sun gear 48 of gearset 42, selectively drives the sun gears 50, 52 of gearsets 44, 46 via clutch C1, and selectively drives the carrier 54 of gearset 44 via clutch C2. The ring gears 56, 58, 60 of gearsets 42, 44, 46 are selectively connected to ground 62 via clutches C3, C4 and C5, respectively. The transmission output shaft 40 couples the driving wheels of the vehicle to the carrier 64 of gearset 46.

The electronic portion of the control is primarily embodied in the engine control module (ECM) 66 and the transmission control module (TCM) 68, illustrated in FIG. 1 as two separate modules. Both control modules 66, 68 may be microprocessor-based. The ECM 66 controls the operation of engine functions depending on the control variables afforded by engine 12, and the TCM 68 controls the PTO clutch 26. The inputs to TCM 68 include signals representing the transmission input speed TIS, the transmission output speed TOS and engine speed ES. The ECM 66 sends an engine torque message (ET) via line 70 to the TCM 68. The TCM 68 sends a maximum engine torque message (MAX ET) via line 72 to the ECM 66. The TCM 68 sends a PTO enable signal via line 74, enabling the activation of the PTO unit 22.

In an alternative embodiment, the PTO unit 22 may use the impeller 16a as a source of power. In this case, the PTO unit 22 is operably connected to the transmission 14 in such a manner to allow the PTO input gear 28 to mesh or engage with a typical gear (not shown) that is operably connected to the impeller 16a. The impeller 16a is mechanically spinning at the same speed as the engine 12, as is the gear that is operably connected to it.

FIG. 2—Flow Chart

Figure 2:
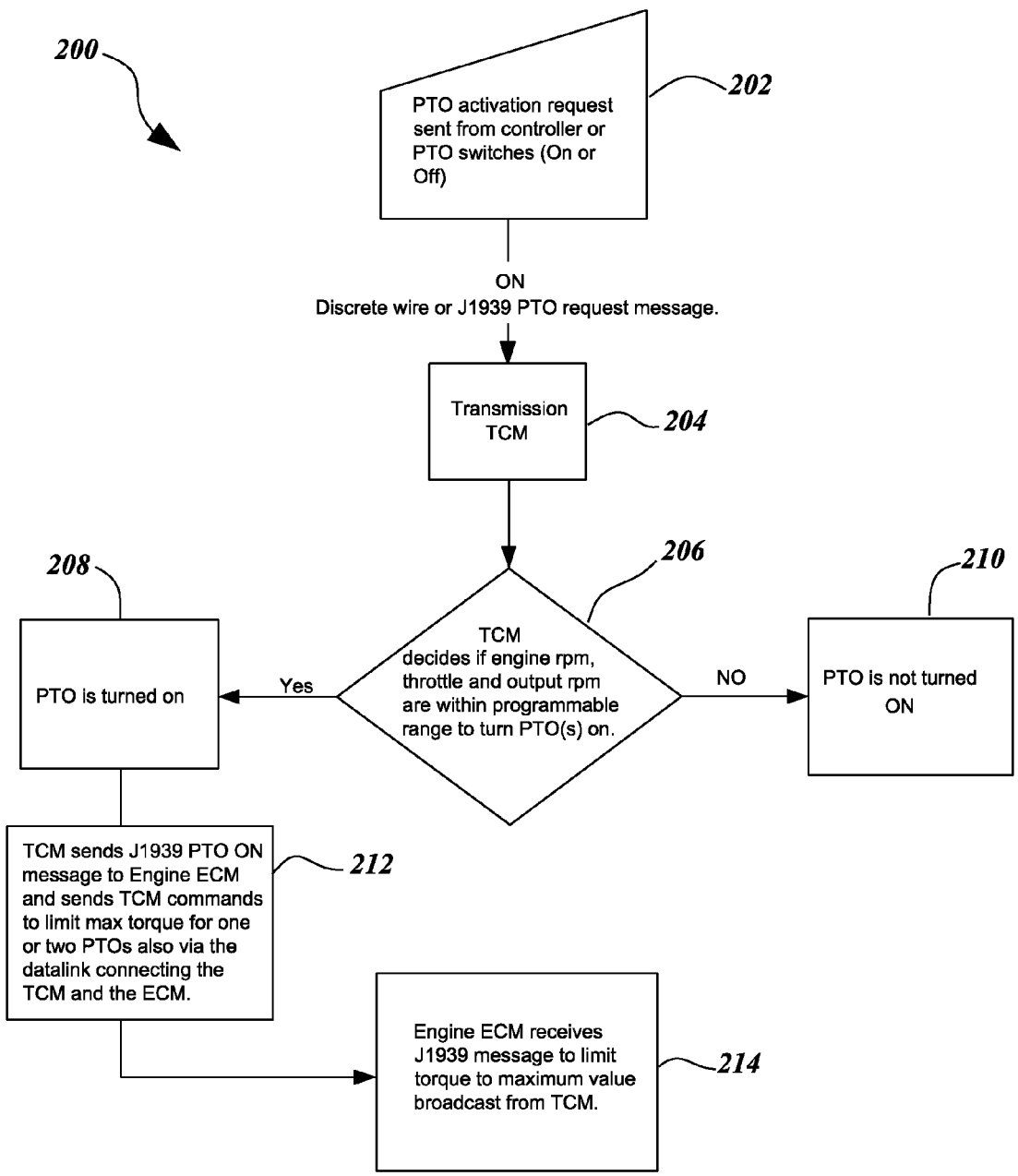
FIG. 2 is a schematic flowchart illustrating the elements of a power-take-off torque protection (PTOTP) program as described below.

FIG. 2 is a schematic flowchart illustrating the elements of a power-take-off torque protection (PTOTP) program 200 as described below. First, as shown at block 202, an activation request signal is sent from a controller or one or more PTO switches at the vehicle controls requesting permission to operate the selected PTO unit 22 in FIG. 1, or any other suitable type of PTO unit. A vehicle may have more than one PTO switch to operate a plurality of PTO units. The PTO switches may be operated independently or together.

The activation request is sent to a transmission control module (TCM) (such as 68 shown in FIG. 1) as shown at block 204. The activation request signal from the controller or PTO switch is preferably sent through an SAE J1939 data link protocol message. As noted above, electronically controlled vehicles and engines generally are interconnected by a shared communication path called a data link. The Society of Automotive Engineers (SAE) has standardized the protocols used by such data links, for example, the SAE J1939 protocol provides for serial data communication between microcomputer systems in heavy duty vehicle applications.

Alternatively, the activation request signal may be sent through discrete wires connecting the controller or PTO switch to the transmission control module (TCM), shown at block 204. Permission to activate is granted based on certain enable conditions being met or based on a programmable range where the PTO is allowed to operate. In the preferred embodiment, the enable conditions are met when: (i) the engine speed is within predetermined limits; (ii) the transmission output speed is within predetermined limits; and (iii) the engine throttle is within predetermined limits (shown in FIG. 2 at block 206). By way of example only, the predetermined limits may be set such that: (1) the engine speed is at 900 rpm or lower; (2) transmission output speed is at 250 rpm or lower; and (3) engine throttle is close to zero, i.e., engine is in idle position. The predetermined limits may be set to other levels.

The number and nature of the enable conditions will vary depending on request signal availability, vehicle manufacturer preference, and other factors. Other examples for enable conditions include a requirement for the range selector to be in park or neutral, or the engine output torque to be below a threshold or other conditions. If the enable conditions or programmable range are exceeded or otherwise not met during the operation of a PTO unit, the PTO unit 22 will automatically shut off.

Next, the transmission control module (TCM) sends a signal back granting or denying permission to activate the PTO unit 22, as shown in blocks 208 and 210, respectively. Once permission is granted, the PTO unit 22 shown in FIG. 1 is activated by operably engaging the PTO output shaft 36 with the transmission PTO drive gear 30. The PTO unit 22 shown in FIG. 1 is inactivated by disengaging the respective gears.

Next as shown at block 212, the transmission control module (TCM) broadcasts the maximum defined torque value across a data link connecting the transmission control module (TCM) to the engine control module (ECM) (such as 66 shown in FIG. 1), i.e., commanding the engine not to exceed the maximum defined torque value or rating for the PTO input gear 28, shown in Figures. The transmission control module (TCM) preferably utilizes the SAE J1939 data link protocol to send the commands to the ECM. The ECM receives the commands, as shown at block 214.

Maximum Defined Torque Value

The maximum defined torque value is computed as a function of the rating of the transmission PTO drive gear 30 (shown in FIG. 1), as well as other sources of loss of torque. Sources contributing to a loss of torque include, for example, a fan (not shown) spinning at the front of the engine 12 resulting in dissipation of torque or an input pump (not shown) on the transmission 14 in FIG. 1. By way of example, if the transmission PTO drive gear 30 has a torque rating of 250 lb-ft and various sources combine to lead to a torque loss of 10 lb-ft, the maximum defined torque limit for the engine 12 in this case will be 260 lb-ft.

In summary, a method is provided of keeping engine torque exposure within defined limits to a power take-off drive element in a transmission capable of operating power take-off equipment, the method including: activating the power take-off equipment by engaging an input element of the power take-off equipment with the power take-off drive element in the transmission, wherein the power take-off drive element has a limited torque rating; and engaging a power-take off torque protection program to keep the engine torque exposure to the power take-off drive element within the limited torque rating of the power take-off drive element.

While the best mode for carrying out the invention has been described in detail, those familiar with the art to which this invention relates will recognize various alternative designs and embodiments for practicing the invention within the scope of the appended claims.

The invention claimed is:

1. An apparatus for controlling torque in a powertrain having an engine and a transmission capable of operating a power take-off unit, the apparatus comprising:
 a controller selectively operable to send a power take-off unit activation request to a transmission control module within said powertrain;
 the transmission control module capable of receiving said power take-off unit activation request;
 an engine control module operably connected to said transmission control module;
 a data link connecting said transmission control module and said engine control module;
 wherein said power take-off unit activation request is sent from said controller to said transmission control module through said data link;
 wherein said power take-off unit is activated when at least one enable condition is met; and
 wherein said transmission control module broadcasts a maximum defined torque value across said data link, commanding said engine not to exceed said maximum defined torque value when said power take-off unit activation request is granted.

2. The apparatus of claim 1, wherein engine torque is controlled for said powertrain during stationary vehicle operation while said transmission is in neutral.

3. The apparatus of claim 1, further comprising:
 a power take-off drive gear in said transmission, said power take-off drive gear being coupled to an input shaft on said transmission;
 a power take-off input gear engaged with said power take-off drive gear;
 a power take-off clutch connected to a power take-off output shaft within said power take-off unit, wherein said power take-off unit is activated by operably engaging said transmission power take-off drive gear with said power take-off output shaft.

4. The apparatus of claim 3, further comprising:
 a power take-off ratio gear connected to said power take-off input gear through a power take-off input shaft;
 an output gear assembly operably connected to said power take-off ratio gear; and
 wherein said power take-off clutch selectively engages said output gear assembly to said power take-off output shaft, thereby operably engaging said transmission power take-off drive gear to said power take-off output shaft.

5. The apparatus of claim 4, further comprising:
 a hydraulic pump operably connected to said power take-off output shaft, to create power for equipment attached to said power take-off unit.

6. The apparatus of claim 5, wherein said maximum defined torque value is equal to or greater than a torque rating of said power take-off drive gear.

7. The apparatus of claim 6, wherein said enable condition is established when all of the following are met: (i) the engine speed is within predetermined limits; (ii) the transmission output speed is within predetermined limits; and (iii) the engine throttle is within predetermined limits.

8. The apparatus of claim 6, wherein the maximum defined torque value is 260 lb-ft when the torque rating of the power take-off drive gear is 250 lb-ft.

9. The apparatus of claim 4, further comprising:
 a driveshaft operably connected to said power take-off output shaft, to create power for equipment attached to said power take-off unit.

10. The apparatus of claim 1, wherein said data link uses an SAE J1939 protocol.

11. An apparatus for controlling torque in a powertrain having an engine and a transmission capable of operating a power take-off unit, the apparatus comprising:
 a controller selectively operable to send a power take-off unit activation request to a transmission control module within said powertrain;
 the transmission control module capable of receiving said power take-off unit activation request;
 an engine control module operably connected to said transmission control module;
 a data link connecting said transmission control module and said engine control module;
 wherein said power take-off unit activation request is sent from said controller to said transmission control module through said data link;
 wherein said power take-off unit is activated when at least one enable condition is met,
 wherein said transmission control module broadcasts a maximum defined torque value across said data link, commanding said engine not to exceed said maximum defined torque value when said power take-off unit activation request is granted;

a power take-off drive gear coupled to an input shaft on said transmission; and wherein said maximum defined torque value is greater than or equal to a torque rating of said power take-off drive gear in said transmission.

12. The apparatus of claim 11, wherein engine torque is controlled for said powertrain during stationary vehicle operation while said transmission is in neutral.

13. The apparatus of claim 11, wherein said data link uses an SAE J1939 protocol.

14. A method of controlling torque produced by an engine in a powertrain where the engine and a transmission are capable of operating a power take-off unit, the method comprising:

sending a power take-off unit activation request to a transmission control module in said powertrain through a selectively operable controller;

activating said power take-off unit when at least one enable condition is met; and implementing a program to prevent said engine torque from exceeding a maximum defined torque value, wherein said program includes:

computing the maximum defined torque value and broadcasting said maximum defined torque value by said transmission control module to an engine control module in said powertrain through a data link connecting said transmission control module and said engine control module.

15. The method of claim 14:

wherein said power take-off unit is activated by using a power take-off clutch connected to a power take-off output shaft to operably engage said power take-off output shaft with a power take-off drive gear in said transmission; and wherein said power take-off drive gear is coupled to an input shaft on said transmission.

16. The method of claim 15, wherein said maximum defined torque value is equal to or greater than a torque rating of said power take-off drive gear in said transmission.

17. The method of claim 16, wherein said enable condition is established when all of the following are met: (i) the engine speed is within predetermined limits; (ii) the transmission output speed is within predetermined limits; and (iii) the engine throttle is within predetermined limits.

18. The method of claim 14, wherein said data link uses an SAE J1939 protocol.

* * * * *